(12) United States Patent
Huang

(10) Patent No.: US 7,816,629 B2
(45) Date of Patent: Oct. 19, 2010

(54) VACUUM HEATING DEVICE

(76) Inventor: Shang-Yuan Huang, 235 Chung-Ho, Box 8-24, Taipei (TW)

( * ) Notice: Subject to any disclaimer, the term of this patent is extended or adjusted under 35 U.S.C. 154(b) by 568 days.

(21) Appl. No.: 11/773,405

(22) Filed: Jul. 4, 2007

(65) Prior Publication Data

US 2009/0008380 A1    Jan. 8, 2009

(51) Int. Cl.
*F27D 11/00* (2006.01)
(52) U.S. Cl. .................. 219/439; 219/438; 219/385; 219/386; 219/387; 219/429; 219/430
(58) Field of Classification Search ............. 219/438–9, 219/385–7, 429–30; 220/422
See application file for complete search history.

(56) References Cited

U.S. PATENT DOCUMENTS 5,935,468 A * 8/1999 Nishino et al. .............. 219/438

* cited by examiner

*Primary Examiner*—Shawntina Fuqua

(57) ABSTRACT

A vacuum heating device comprises: a pot body having an inner casing and an outer casing; a vacuum space being formed between the inner casing and the outer casing; a heat source installed at a lower outer side of the inner casing; a pot cover installed at a top of the pot body; the pot cover having a vent hole; the pot cover tightly covering the receiving space of the inner casing so as to have a preferred heat preservation effect; and an energy supply device for actuating the heat source to generate heat to heat the inner casing. The energy supply device is a conductor body which is connected to the heat source. Or the energy supply device is an electromagnetic generator installed at a lower side of the pot body.

1 Claim, 5 Drawing Sheets

VACUUM HEATING DEVICE

FIELD OF THE INVENTION

The present invention relates to heating devices, and particularly to a vacuum heating device, wherein the heating device has an inner casing and an outer casing, a vacuum space is formed between the inner casing and outer casing. A heat source is at a lower outer side of the inner casing. Because the vacuum space is a non-heat transfer structure so that the heat from the heat source can be effectively transfer to the inner casing to heat an object in the receiving space of the inner casing.

BACKGROUND OF THE INVENTION

Conventionally, an electric heating device has a pot body 50 and a cover 51, see FIG. 5. The pot body 50 includes an outer casing 54 made of composite resin, an aluminum inner casing 52 and a heat source 53 which heats the pot body 50 from a bottom of the body. The object in the pot body is heated electrically. Some heat is lost from the through hole 55 at the bottom, the cover 51 and the outer casing 54. Air is filled between the outer casing 54 and the inner casing 52. The heat will transfer out to air by heat convection. Furthermore if the temperature difference between the outer side of the pot body 50 and the inner side of the pot body 50 is great, the heat dissipation is also greater. Although the prior art structure can retain heat therein, the effect is low. For a long time, the heat will lost. Thus the prior art heating device is not effective and is not power-saved.

SUMMARY OF THE INVENTION

Accordingly, the primary object of the present invention is to provide a vacuum heating device, wherein the heating device has an inner casing and an outer casing, a vacuum space is formed between the inner casing and outer casing. A heat source is at a lower outer side of the inner casing. Because the vacuum space is a non-heat transfer structure so that the heat from the heat source can be effectively transfer to the inner casing to heat an object in the receiving space of the inner casing.

To achieve above objects, the present invention provides a vacuum heating device comprising: a pot body having an inner casing and an outer casing; a vacuum space being formed between the inner casing and the outer casing; a heat source installed at a lower outer side of the inner casing; a pot cover installed at a top of the pot body; the pot cover having a vent hole; the pot cover tightly covering the receiving space of the inner casing so as to have a preferred heat preservation effect; and an energy supply device for actuating the heat source to generate heat to heat the inner casing. The energy supply device is a conductor body 5 which is connected to the heat source. Or the energy supply device is an electromagnetic generator installed at a lower side of the pot body.

A receiving space is formed in the inner casing for receiving an object. A heat source is an electric heating film or electric heating sheet. The pot cover has two layers and a vacuum space is formed between the two layers. A lower periphery of the pot cover is installed with a rubber pad. The pot cover is made of metal or other material.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
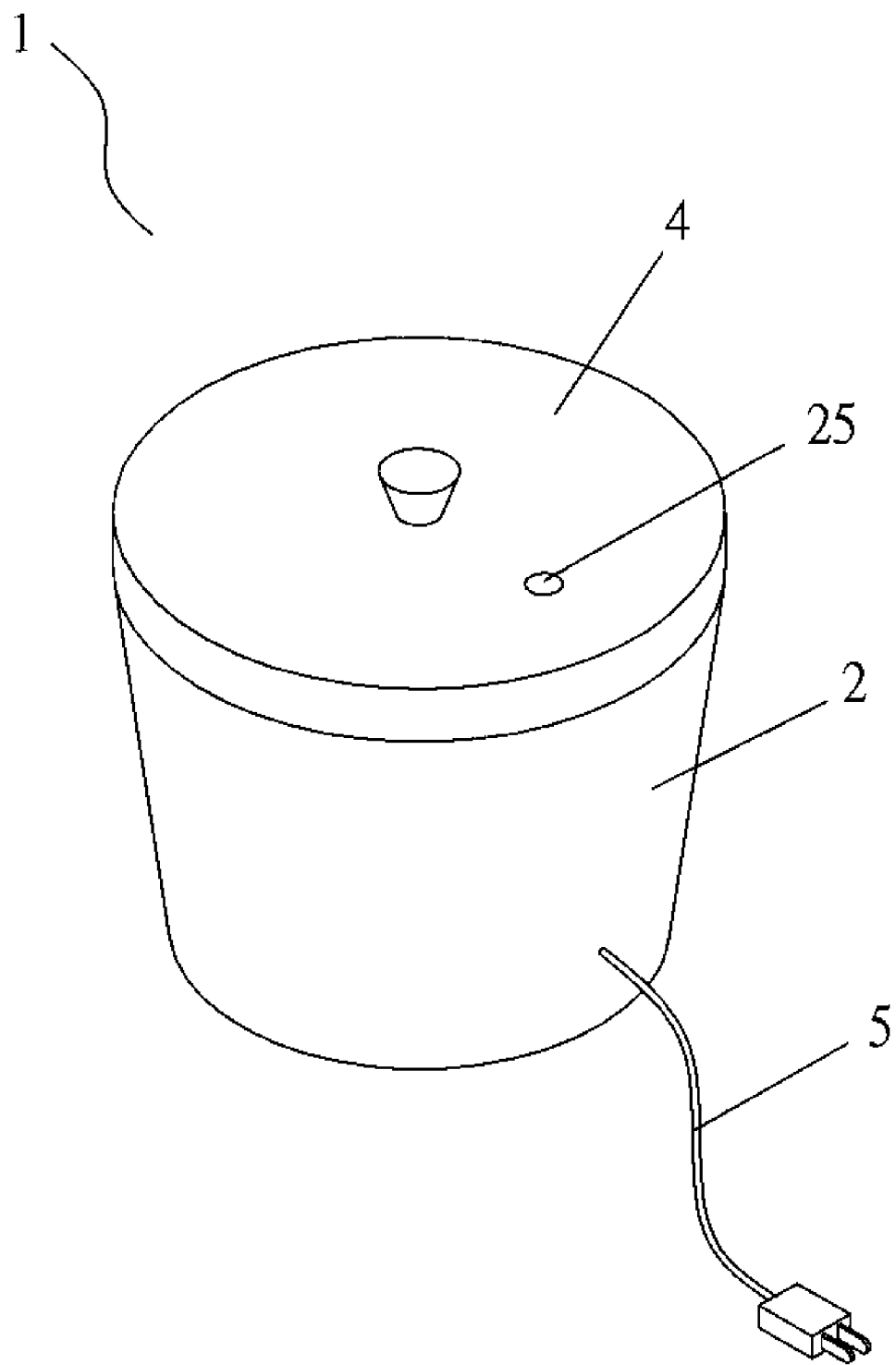
FIG. 1 is a perspective view of the present invention.
Figure 2:
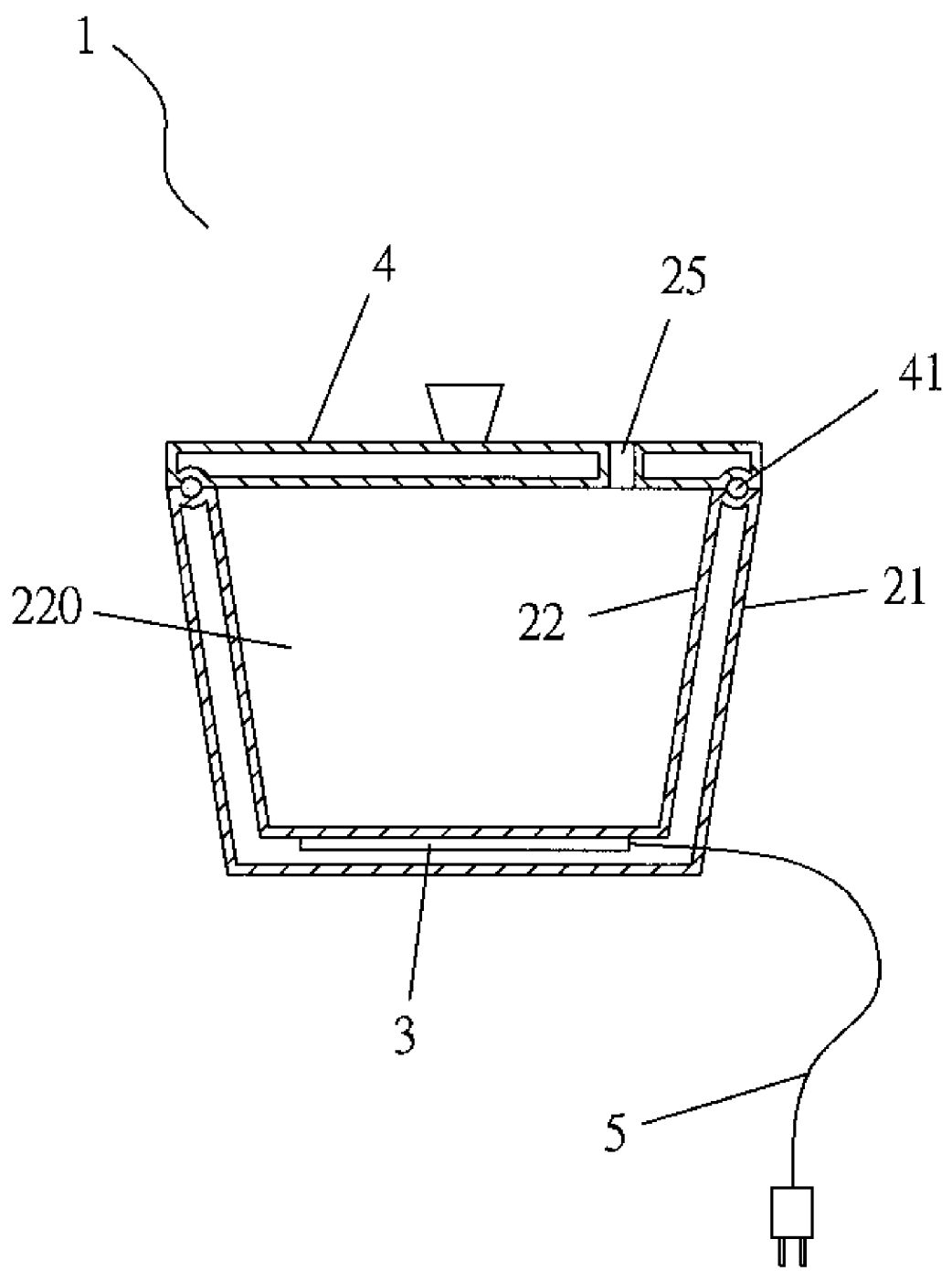
FIG. 2 is a cross sectional view of the present invention.

Referring to FIGS. 1 and 2, the vacuum heating device 1 of the present invention is illustrated. The present invention has the following elements.

A pot body 2 is made of metal or other material. The pot body 2 has an inner casing 22 and an outer casing 21. A vacuum space is formed between the inner casing 22 and the outer casing 21. The outer casing 21 has a bottom and a wall extended upwards from the bottom. A receiving space 220 is formed in the inner casing 22 for receiving an object.

A heat source 3 is an electric heating film or an electric heating sheet. The heat source 3 is connected to a conductor body 5 for supplying electric power to the heat source 3. The heat source 3 is installed at a lower outer side of the inner casing 22.

A pot cover 4 is installed at a top of the pot body 2. The pot cover 4 has a vent hole 25. The pot cover 4 has two layers and a vacuum space is formed between the two layers. A lower periphery of the pot cover 4 is installed with a rubber pad 41. The pot cover 4 is made of metal or other material. The pot cover 4 tightly covers the receiving space 220 of the inner casing 22 so as to have a preferred heat preservation effect.

Figure 3:
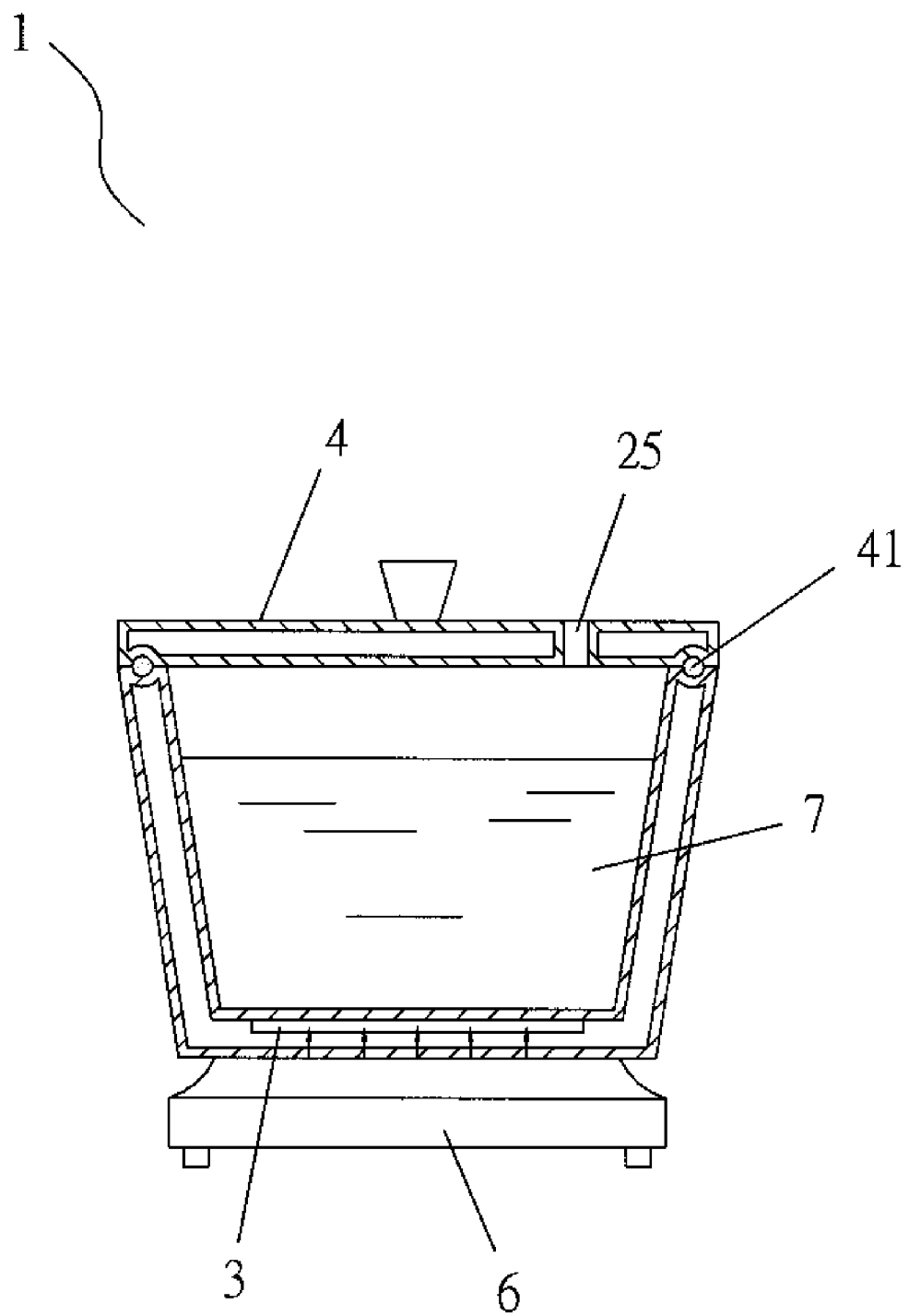
FIG. 3 is a cross sectional view of another embodiment of the present invention.

Referring to FIG. 3, an electromagnetic generator 6 is installed at a lower side of the pot body 2. The electromagnetic generator 6 serves for generating electromagnetic waves so as to induce the heat source 3 to emit heat to heat the object 7 in the receiving space 220. The heat from the heat source 3 can be effectively transferred to the object 7 without losing.

Figure 4:
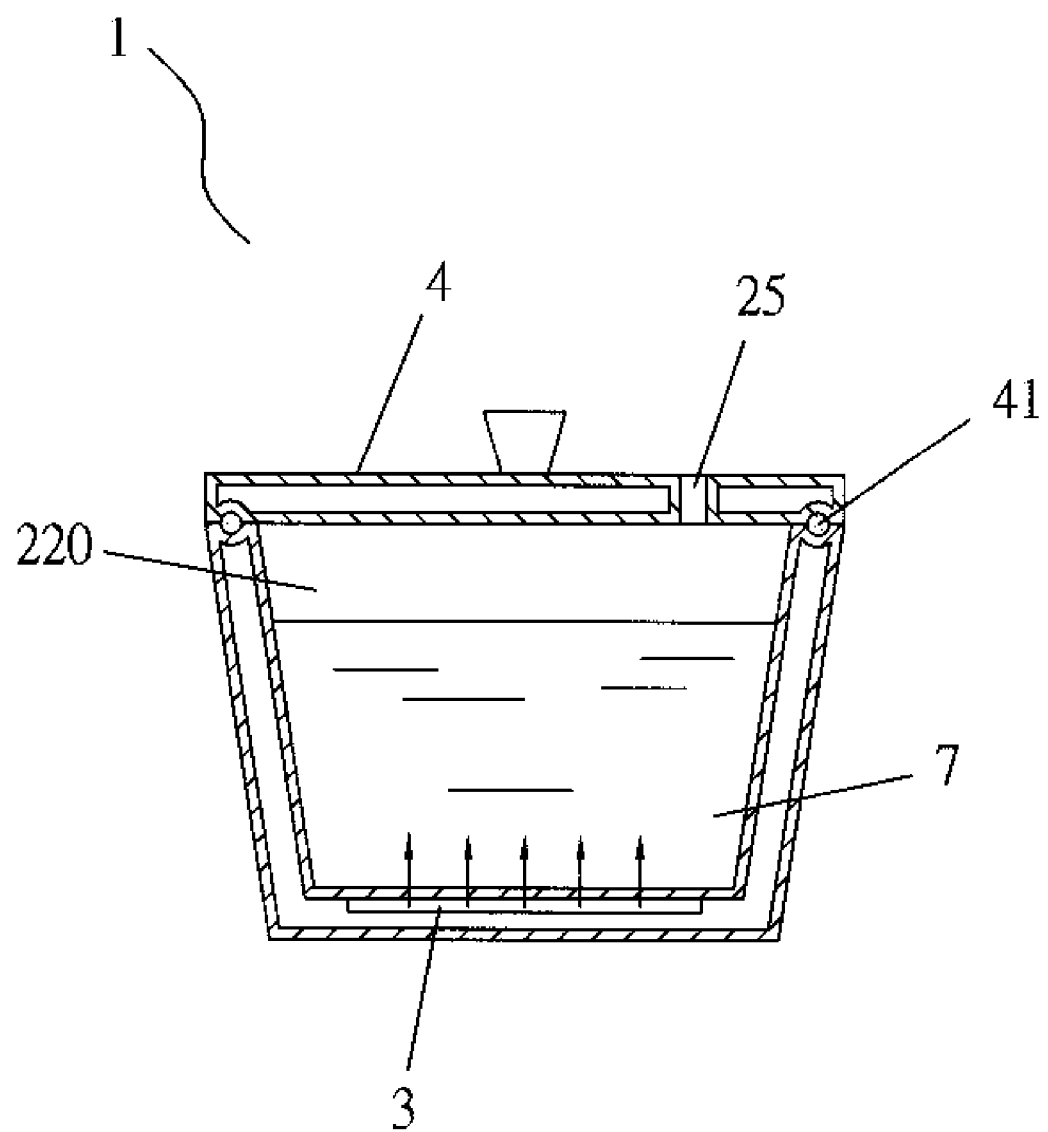
FIG. 4 is a cross sectional view of a further embodiment of the present invention.
Figure 5:
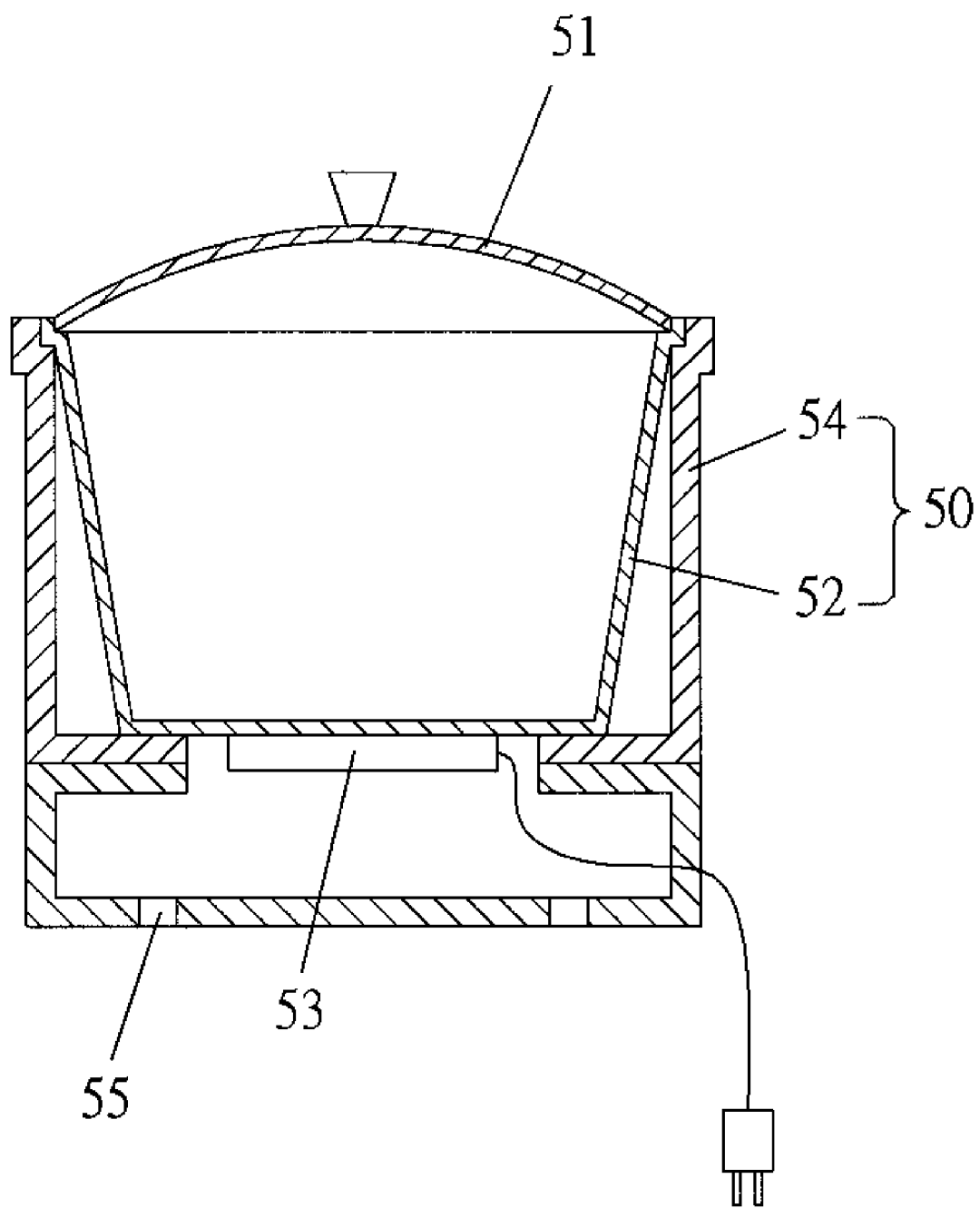
FIG. 5 is a cross sectional view of a prior art heating device.

Referring to FIGS. 1 and 4, in the vacuum heating device 1 of the present invention, the vacuumed pot body 2 causes that the heat from the heat source 3 only transfers to the object 7. No air is in the receiving space 220 and no heat convection is formed in the vacuum space between the inner casing 22 and outer casing 21. A preferred heat preservation is retained.

Thus, in the present invention, only one half of the power is necessary. For example, if in a conventional heat source, a 800 watts of heat is emitted, only 400 watts is transferred to the object in the receiving space 220, but in the present invention, only a heat source 3 of 400 watts is necessary.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A vacuum heating device, comprising:

a pot body (2) made of metal; the pot body (2) having an inner casing (22) and an outer casing (21; a vacuum space is formed between the inner casing (22) and the outer casing (21); the outer casing (21) having a bottom and a wall extended upwards from the bottom; a receiving space (220) furthermore, formed in the inner casing (22) for receiving an object;

a heat source (3) being an electric heating film or an electric heating sheet; the heat source (3) being connected to a conductor body (5) for supplying electric power to the heat source (3); the heat source (3) being installed at a lower outer side of the inner casing (22);

a pot cover (4) installed at a top of the pot body (2); the pot cover (4) having a vent hole (25); the pot cover (4) having two layers and a vacuum space being formed between the two layers; a lower periphery of the pot cover (4) being installed with a rubber pad (41); the pot cover (4) being made of metal; the pot cover (4) tightly covering the receiving space (220) of the inner casing (22) so as to have a preferred heat preservation effect; and an electromagnetic generator (6) installed below a lower side of the pot body (2) for generating electromagnetic waves so as to induce the heat source (3) to emit heat to heat the object (7) in the receiving space (220).

* * * * *